United States Patent [19]

Johnson et al.

[11] 4,032,936
[45] June 28, 1977

[54] PHOTOGRAPHIC APPARATUS HAVING FILM CONTAINER LOCATING STRUCTURE

[75] Inventors: Bruce K. Johnson, Andover; Donald H. Hendry, Rockland, both of Mass.

[73] Assignee: Polaroid Corporation, Cambridge, Mass.

[22] Filed: Mar. 16, 1976

[21] Appl. No.: 667,381

Related U.S. Application Data

[63] Continuation of Ser. No. 554,779, March 3, 1975, abandoned.

[52] U.S. Cl. .................................. 354/83; 354/288
[51] Int. Cl.² .................. G03B 19/02; G03B 17/00
[58] Field of Search ............................. 354/83-86, 354/202, 288

[56] References Cited

UNITED STATES PATENTS

| 2,741,168 | 4/1956 | Schreiber | 354/202 X |
| 2,911,894 | 11/1959 | Hennig et al. | 354/288 X |
| 3,266,396 | 8/1966 | Padelt | 354/288 X |

FOREIGN PATENTS OR APPLICATIONS

| 438,010 | 11/1967 | Switzerland | 354/288 |
| 467,140 | 6/1937 | United Kingdom | 354/288 |

*Primary Examiner*—Donald A. Griffin
*Attorney, Agent, or Firm*—John S. Vale

[57] ABSTRACT

A modular self-developing camera having structure therein for accurately positioning a film container, holding self-developing film units therein, at an operative location within the camera wherein a film unit in the film container is properly orientated with respect to the exposure plane, a film advancing device and a film processing station. The modular camera features a unitized frame for mounting components and subassemblies thereon. The frame is configured to cooperate with portions of a camera housing section to define a receiving chamber for the film container.

28 Claims, 8 Drawing Figures

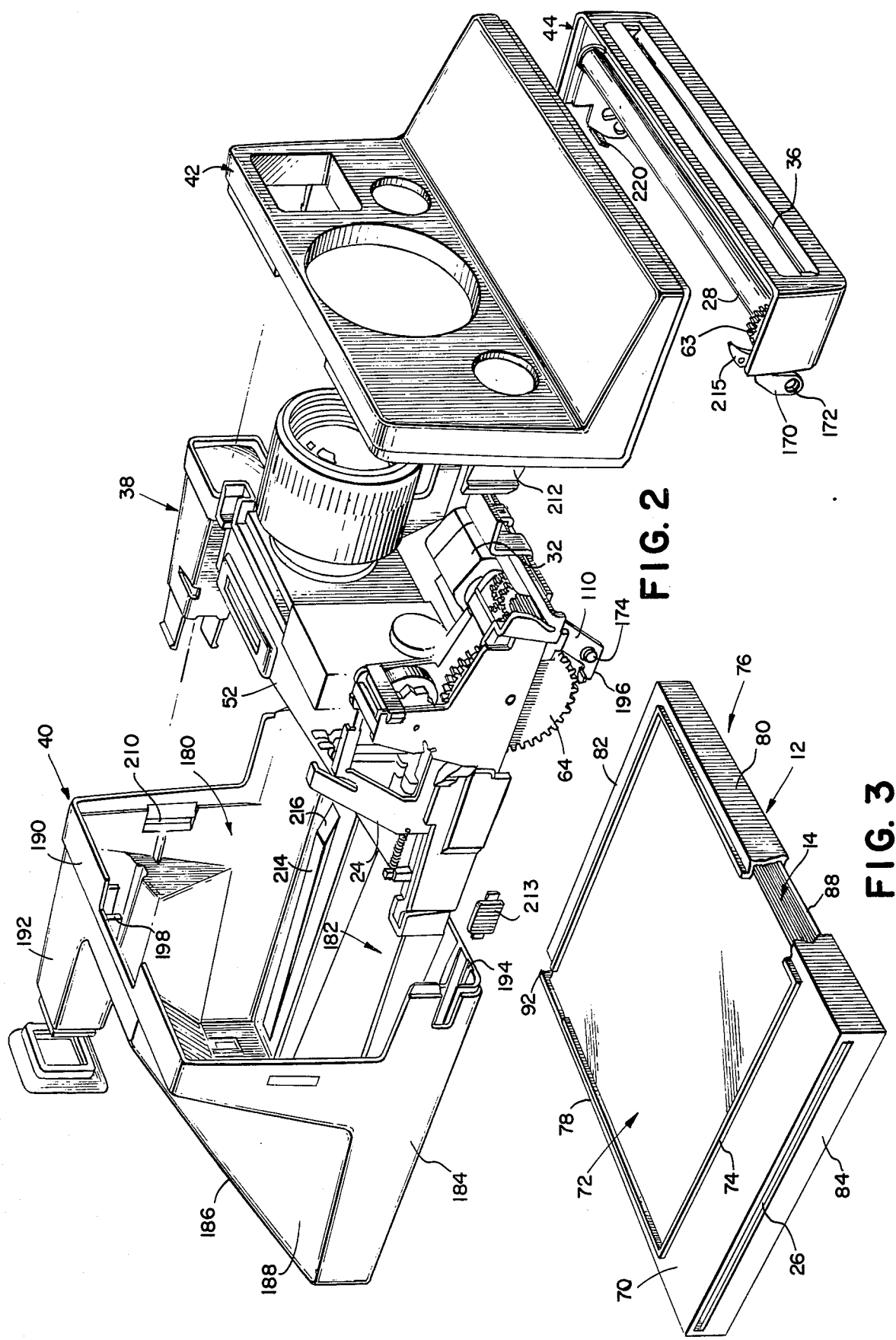

PHOTOGRAPHIC APPARATUS HAVING FILM CONTAINER LOCATING STRUCTURE

This is a continuation of application Ser. No. 554,779 filed Mar. 3, 1975 and now abandoned.

BACKGROUND OF THE INVENTION

1. Field of the Invention

The present invention relates to the field of photography and, more particularly, to photographic apparatus or cameras having structure therein for accurately locating a film container at an operative position within the apparatus or camera.

2. Description of the Prior Art

A large percentage of the photographic film sold at the present time is packaged in film containers, cartridges or cassettes which become part of a photographic system when inserted into a camera or other photographic device.

The film containers generally include an exposure aperture and structure which cooperates with complementary camera structure for accurately positioning the film container at an operative location within the camera to position a film unit in the container in coincidence with the exposure plane.

The degree of accuracy of film container positioning varies with the type of film contained therein and the functional complexity of the camera. Conventional film, processed outside of the camera, requires that the film container be properly oriented only for exposuure. Self-developing film units that are manually pulled by tabs through a camera mounted processing station impose the additional requirement of properly orientating a film container withdrawal slot with respect to the processing station. A more recent version of the self-developing film unit is adapted for use in a camera having a film advance device for transporting the film unit from the film container to the processing station. In this last system, the film container must be accurately orientated with respect to the exposure plane, the processing station, and the film advance device.

Those skilled in the photographic art will appreciate that as the number of required orientations increases, the manufacturing tolerances of the complementary film container and camera positioning structure become more demanding. This in turn increases manufacturing costs and the ultimate retail price of the system.

The present invention is directed to providing a low-cost and easily manufactured (on a high volume basis) camera or photographic apparatus for use with a film container holding self-developing film units of the last-mentioned type. Representative examples of the film unit are disclosed in U.S. Pat. Nos. 3,415,644 and 3,594,165. Typical film containers for these film units are disclosed in U.S. Pat. Nos. 3,748,984; 3,820,137; and 3,821,049.

Previously known cameras having positioning structure therein for the last-mentioned type of film container are characterized by their conventional methods of construction. Individual high tolerance piece parts are sequentially assembled using traditional fasteners (screws, rivets, etc.) and/or joining processes (adhesive, thermo, and ultrasonic bonding). In order to achieve the required precision in the assembled product, it is often necessary to employ high tolerance fasteners and precision alignment jigs and fixtures. In some instances, certain piece parts have an adjustable mounting arrangement and must be "factory aligned" at some point in the manufacturing procedure. All of these factors significantly contribute to the manufacturing cost.

Representative examples of prior art cameras having film container positioning structure for establishing an operative location for a film container with respect to the exposure plane, processing station and film advance device are disclosed in U.S. Pat. Nos. 3,593,631; 3,640,724; 3,653,313; 3,672,283; 3,682,076; 3,683,771; 3,748,984; 3,705,537; 3,779,770; and 3,810,211.

In an attempt to reduce production costs there have been previous camera designs which are based upon modular construction techniques. The modular system is characterized by modular subassemblies that are joined together without or with a minimum of conventional fasteners. Examples of cameras utilizing modular construction are set forth in U.S. Pat. Nos. 2,484,510; and 3,412,662.

None of the prior art disclosures, however, suggest or teach the concept of providing a modular camera having film container positioning structure for orientating a film container with respect to the exposure plane, film advance device, and film processing station.

SUMMARY OF THE INVENTION

The present invention provides a low-cost and easy to manufacture self-developing camera having structure for positioning and maintaining a film container at an operative position therein with respect to the camera exposure plane, film advance device and processing station.

The camera is characterized by its modular construction and features an internal component support frame, or "primary modular building block," including reference-bearing surfaces for properly orientating the film container, and structure for mounting subassemblies of the camera in a predetermined and accurate relationship to the film container.

In a preferred embodiment, the "primary modular building block" comprises a unitized frame formed by a cone-like member and a connected bracket for mounting a film processing assembly (including a pair of pressure-applying rollers).

The cone-like member is the primary piece part of the entire modular system. It is preferably of molded construction and includes three key integrally formed bearing surfaces for film container orientation. All of the other integrally molded elements of the cone are spatially orientated in a predetermined relationship with the key bearing surfaces. Preferably, the cone-like member also forms the camera exposure chamber.

The second piece part of the unitized frame is the roller assembly mounting bracket. The two piece parts are interlocked or unitized in fixed relation by integrally formed snap-together connectors, with the cone providing the proper orientation for the bracket. The snap-together connectors eliminate the need for conventional fasteners, joining processes and precision assembly fixtures.

Once the first and second piece parts are interlocked, the frame serves as the means for mounting camera components or subassemblies in predetermined relationship to the key film container bearing surfaces. These components or subassemblies include an optical system, exposure control system, film advance and camera sequencing system, and a pressure roller assembly. Each subassembly is of modular construction and "snaps" onto the frame. Again, integrally formed elements on the frame provide the predetermined orientation for the modular units with respect to the key reference surfaces.

With the modular units and/or components mounted on the frame, the camera is operational and may be tested. Advantageously, each of the modular subassemblies and/or components is accessible for inspection and immediate replacement if necessary.

The modular concept is carried one step further. The camera is provided with a modular, snap-together housing. The major housing section is open-ended and the frame with its mounted modular units is slidably insertable into the major housing section through the open end. Integrally formed elements of the major housing section and frame cooperate to accurately locate the frame at a predetermined location therein. So positioned, the frame and major housing section cooperate to define a film container receiving chamber. Also, elements of the frame and major housing section cooperated to urge the film container into proper bearing relationship with the key bearing surfaces. The frame is maintained at its proper location by another housing section that snaps onto the major housing section in at least partial closing relation to the open end thereof.

Therefore it is an object of the present invention to provide a low-cost and easy to manufacture self-developing photographic apparatus or camera being characterized by its modular construction and featuring means therein for properly positioning a film container with respect to an exposure plane and other camera components including a film advance device and a film processing station.

It is another object of the invention to provide a photographic apparatus or camera including a unitized frame, mounting camera systems and/or subsystems, and a camera housing section which cooperate to define a receiving chamber for a film container.

It is yet another object of this invention to provide a camera of modular construction which includes a housing and a utilized frame that define an operative position for a film container with respect to an exposure plane, film advance device, and processing station and also forms a film exposure chamber.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein:

FIG. 2 is an exploded perspective view of the camera shown in FIG. 1 illustrating the relationship of the major modular units forming the camera;

FIG. 3 is a perspective view, partly in section, of a film container, holding a plurality of self-developing film units, that is adapted for use with a camera embodying the instant invention;

DESCRIPTION OF THE PREFERRED EMBODIMENT

Figure 1:
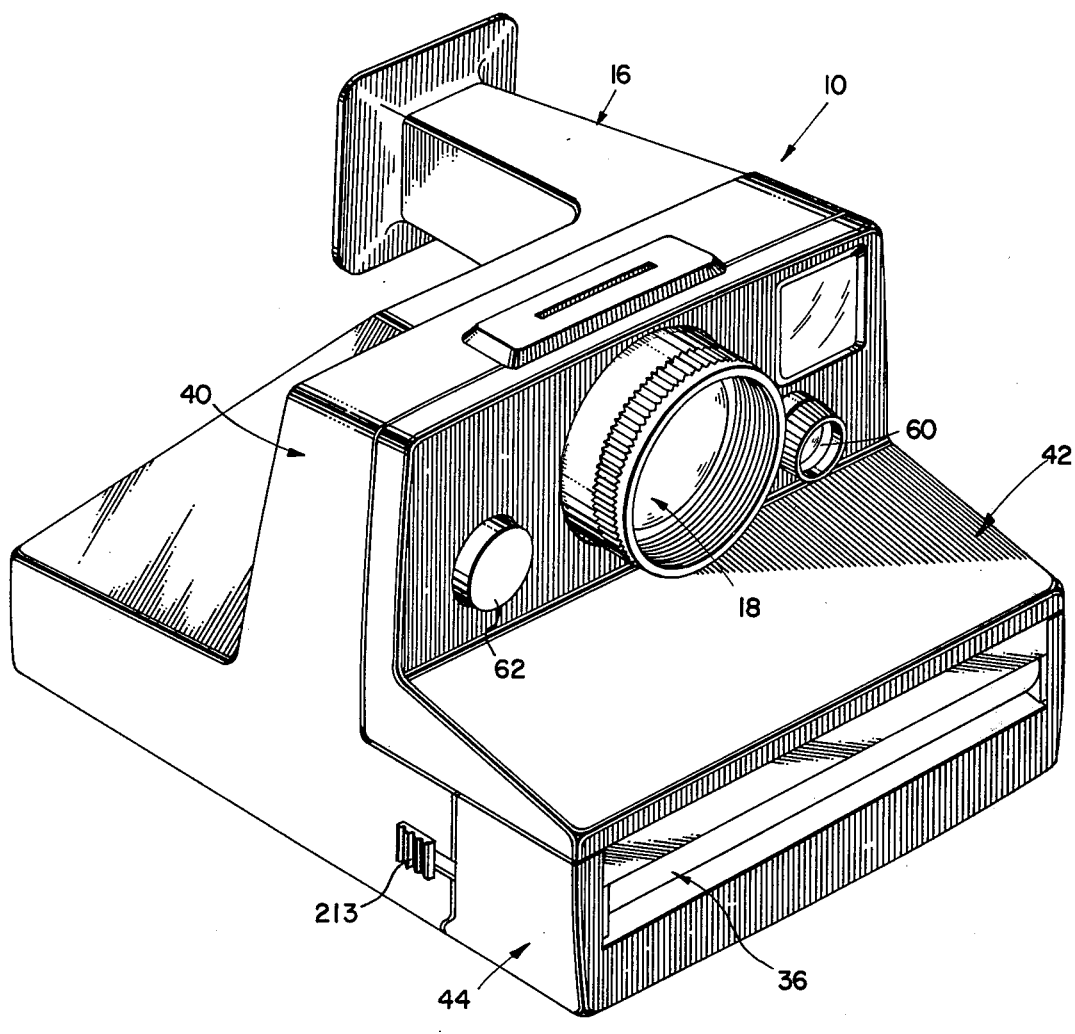
FIG. 1 is a perspective view of a completely assembled, modular constructed camera embodying the instant invention.

FIGS. 1 and 3 of the drawings show, respectively, a self-developing camera 10 which is adapted to receive a film container 12 holding a plurality of self-developing film units 14 therein. The present invention focuses on camera structure for properly positioning the film container 12 within camera 10. Those elements of camera 10 that do not directly relate to the inventive concepts will be described rather briefly and only in sufficient detail to provide the necessary background to adequately and clearly disclose the invention.

Figure 5:
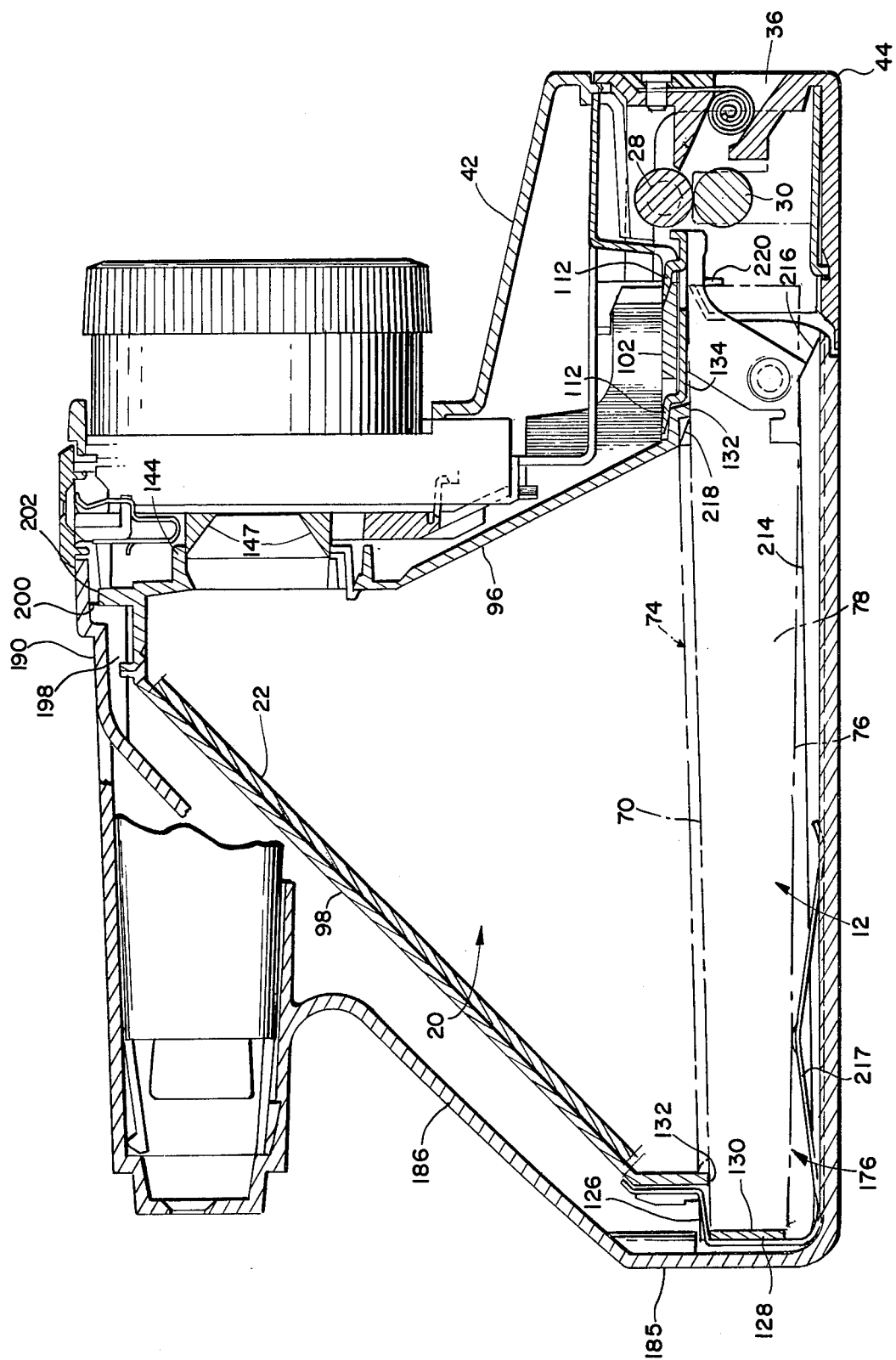
FIG. 5 is a side elevational view, partly in section, of the camera shown in FIG. 1 illustrating the structural relationship of the components within the camera.

The illustrated camera 10 is a compact, nonfolding, highly automated, battery-operated camera for automatically exposing and processing the self-developing film units 14. As best shown in FIG. 5, the film container 12 is to be positioned at an operable location in the base of camera 10. A Galilean-type rangefinder 16 is provided for viewing and framing.

Image-bearing light from the scene enters camera 10 through an objective lens 18 and is transmitted through an interior exposure chamber 20 such that it impinges upon an inclined mirror 22 which reflects the light downwardly to expose the forwardmost film unit 14 in film container 12. Subsequent to exposure, a film advance device shown generally at 24 in FIGS. 2 and 4 advances the exposed film unit 14 forwardly, through a film withdrawal slot 26 at the leading end of the film container 12, and into the bite of a pair of juxtaposed cylindrical pressure-applying rollers 28 and 30. A motor 32 and gear train 34, which operate the film advance mechanism 24, also drive at least one of the rollers 28 and 30 in a direction to cause the film unit 14 to be advanced therethrough and out of a film exit slot 36 at the leading end of the camera 10. As the exposed film unit passes between the rollers 28 and 30, a compressive pressure is progressively applied to the film unit 14 which releases and subsequently distributes a fluid processing composition between predetermined layers of the film unit in a manner well known to those who are skilled in the art of self-developing photographic systems.

The design objective for camera 10 is to provide a low cost and easy to manufacture photographic apparatus while maintaining the precision and tolerances required to properly and reliably expose and process self-developing film units. This objective is achieved by employing modular construction.

The following is a brief description of guidelines set forth to define the modular construction technique. (1) As many of the individual piece parts of the camera as possible will be of molded plastic construction. (2) Where possible, the molded piece parts will include integrally formed connectors, preferably of the snap-together type, for interlocking the piece part with the next adjacent piece part. (3) Piece parts will be assembled into modular units defining a system or subsystem (for example, an exposure control module, a film transport and camera sequencing module, etc.). (4) Individual modules will snap onto a central core frame or skeleton to form an operational camera that is not enclosed by a housing so that all of these systems are accessible for testing and immediate replacement if necessary. (5) The operational unit will be enclosed by a modular housing which is characterized by molded housing sections that snap together.

Those having skill in the manufacturing art will appreciate the merits of the above-described construction system for reducing manufacturing costs and simplifying assembly techniques. The precision of the individual molded piece parts is derived from the accuracy of the molds. The snap-together feature eliminates the need for conventional fasteners, joining techniques and precision alignment fixtures.

As best shown in FIG. 2, camera 10 is formed by four primary or major modular units. Modular unit 38 is virtually an operational camera lacking only an enclosing housing. Subsequent to assembly, modular unit 38 is inserted into a hollow, modular, major housing section 40. The camera assembly is completed by snapping into place (as shown in FIG. 1) a second modular housing unit 42 and third modular housing unit 44 having the processing rollers 28 and 30 mounted therein.

Figure 4:
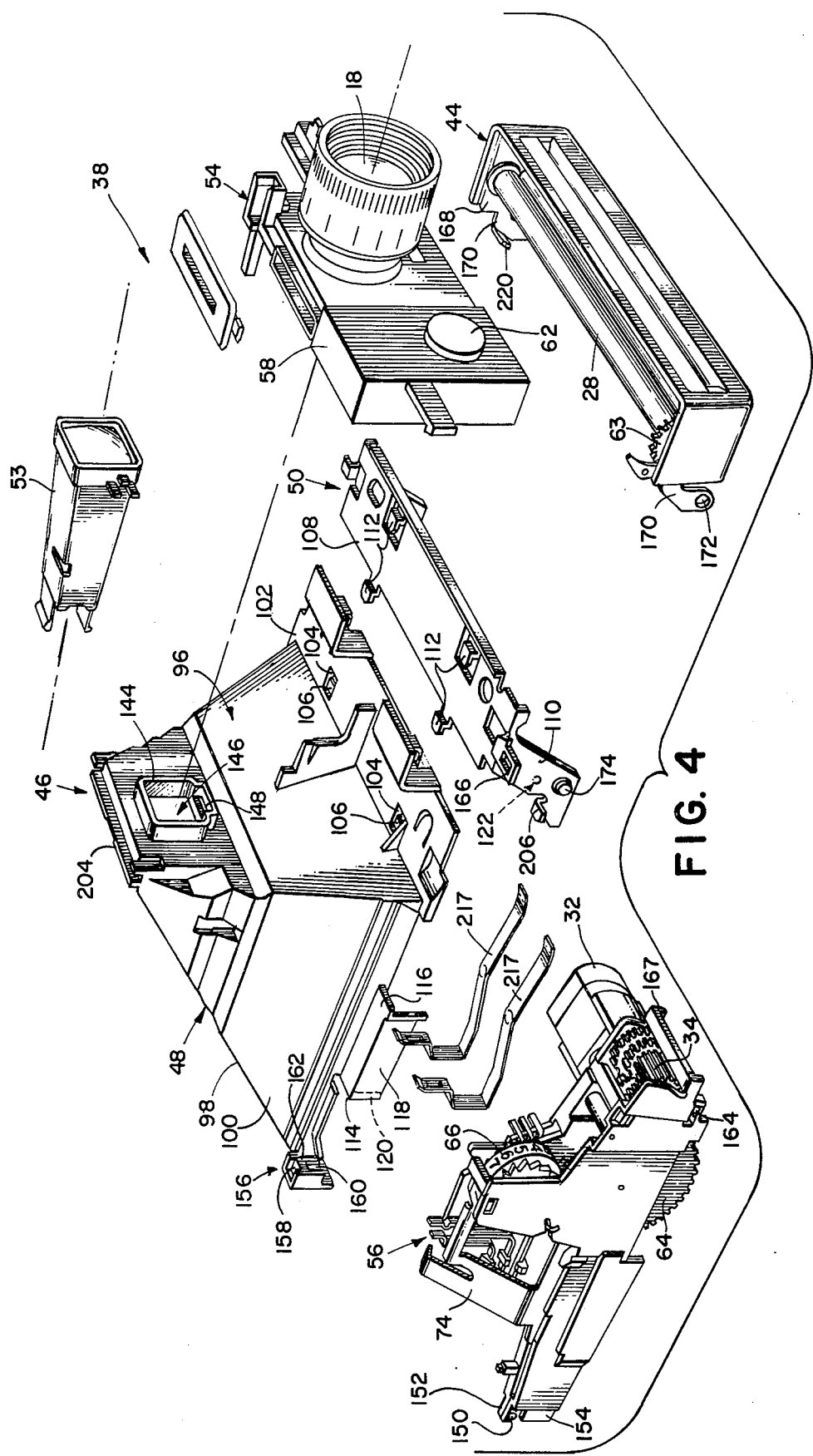
FIG. 4 is an exploded perspective view showing the component parts and/or subassemblies which form an assembled major modular unit shown in FIG. 2.

As best shown in FIG. 4, the primary piece part of camera 10 is a central core component support member 46 having integrally molded therewith key reference bearing surfaces (to be described in detail hereinafter) for locating the film container 12 within camera 10. Using these reference surfaces as a base line, member 46 includes integrally molded mounting elements for other camera components and modular units that are located in a predetermined spatial relationship with these reference surfaces. Member 46 is of molded plastic construction and includes a hollow cone-like portion 48 which has integrally molded dependent or outwardly extending elements at the periphery or base of the cone. A generally U-shaped and preferably stamped metal roller assembly mounting bracket 50 is adapted to be snap connected to member 46 in a position shown in FIGS. 2 and 5 thereby forming a multifunctional unitized frame or skeleton. When bracket 50 is located in its operative position on support member 46, the unitized frame will be designated and hereinafter referred to as frame or skeleton 52. Frame 52 is to be considered the primary building block of camera 10 since its primary function is to mount and accurately position the cooperating operative units of the camera in predetermined spatial relationship to one another and a film container 12 located within the base of camera 10.

The major subassemblies that are adapted to be mounted and supported on the unitized frame member 52 are best shown in FIG. 4 of the drawings. These include a Galilean viewfinder subassembly 53, an exposure control module 54, the roller and housing section assembly 44 and a camera drive, film advance, sequencing, and film counting module 56.

The exposure control module 54 includes a housing 58 which mounts the camera objective lens 18, a photocell 60, and a camera start button 62. Enclosed by housing 58 is an electronically operated shutter and automatic exposure control circuitry (neither of which are shown in the drawings).

Modular unit 56 mounts the motor 32 and the speed reduction gear train 34 thereon. The gear train 34 in turn drives roller 28 (through a gear 63 on the end thereof) and a camera sequencing gear 64 mounted to the rear of gear train 34. Sequencing gear 64 is adapted to be driven through a single 360° revolution during the course of a cycle of camera operation. By means of a profile cam (not shown) on the interior side of gear 64, it controls the sequential operation of certain components including rotatably driven film counter 66 and the film advance mechanism 24, both of which are mounted on modular unit 56. Subsequent to film exposure, sequencing gear 64 drives the film advance device 24 forwardly along a linear path, so that hook-like member 68 (see FIG. 8) at the end of film advance device 24 engages the trailing end of the exposed film unit 14 and advances it forwardly through the film container withdrawal slot 26 and into the bite between rollers 28 and 30.

In operation, the user frames the subject to be photographed using viewfinder 16 and focuses the objective lens 18. To initiate the cycle of operation, the camera start button 62 is depressed thereby energizing a camera logic and control circuit. This circuit energizes motor 32 causing the sequencing gear 64 to actuate a shutter latching device (not shown) which unlatches the normally closed shutter. At this point, the motor 32 is deenergized and the automatic exposure control circuit takes over and evaluates lighting conditions by means of the photocell device 60. Using well-known light integrating techniques, an exposure terminating signal is generated in response to the integrating portion of the circuit reaching a predetermined level. The exposure terminating signal triggers the electronic shutter which is moved to its light blocking position.

Upon exposure termination, the motor 32 is once again energized by the logic circuit thereby simultaneously driving sequencing gear 64 and the top roller 28. Gear 64 actuates the film counter 66 and drives the film advance device 24 forwardly to cause the advancement of the exposed film unit 14 into the bite of rollers 28 and 30. The top roller 28 is driven in a direction to cause the film unit to be transported between the rollers for progressively applying a compressive pressure along the length of the film unit and advancing it through camera exit slot 36. During the processing phase of the cycle, sequencing gear 64 also resets various components for subsequent operation and finally actuates an electrical switch (not shown) which terminates the camera cycle of operation.

The preceding has been a brief description of the construction and operation of the subassemblies mounted on unitized frame 52. Only enough detail has been provided to set forth the operating environment for the inventive concepts which are to be described in detail hereinafter. For those who are interested in a detailed description of the structure and operation of the various subsystems, reference may be had to the following copending applications filed on even date herewith: Ser. No. 554,774 Ser. No. 554,778 now U.S. Pat. No. 3,967,304 issued June 29, 1976; and Ser. No. 554,769.

At this point it is appropriate to give a more detailed description of the film container 12 and its contents to provide background for a following description of the camera structure which engages, supports and properly positions a film container 12 within the base of camera 10.

The film container 12 (see FIG. 3) is a box-like structure preferably of molded plastic construction. It includes a generally planar forward wall 70 having a square or rectangular exposure aperture 72 therein through which actinic light is transmitted to expose the forwardmost film unit 14. The exposure aperture 72 is bounded about most of its periphery by an integrally formed upstanding rib 74. Spaced from forward wall 70 is an opposed generally planar rear wall 76. Intermediate forward wall 70 and rear wall 76 is a peripheral section of the film container 12 defined by a pair of opposed lateral side walls 78 and 80, a trailing end wall 82, and an opposed leading end wall 84 having the film withdrawal slot 26 therein adjacent to the leading edge of forward wall 72.

In a preferred embodiment, there are ten (10) self-developing film units 14 arranged in stacked relation within film container 12. Initially included, but not shown in the drawings, is a dark slide which protects the forwardmost film unit in the stack from exposure through aperture 72. Once the film container is located at its operative position within camera 10, the dark slide is removed through film exit slot 26. The stack of film units 14 is biased upwardly toward the interior surface of the forward wall 70 by a spring platen element (not shown). In a preferred embodiment of the film container 12, a flat battery 88 is positioned in overlying relationship to the bottom wall 76 of the film container. Battery 88 provides energy for powering the electrical system of camera 10 and its positive and negative terminals are accessible through an appropriate pair of openings (not shown) in film container bottom wall 76.

The self-developing film unit 14 is preferably of the "integral type" which does not require the separation of individual positive and negative sheets subsequent to processing. The film unit 14 includes an opaque bottom outer support sheet or layer, a transparent top outer support sheet or layer, and a plurality of superposed layers of photographic materials, including one or more photosensitive image-receiving layers sandwiched between the two outer support sheets. At one end of the film unit is a rupturable container holding a supply of fluid processing composition.

The photosensitive layer or layers are adapted to be exposed by actinic light transmitted through the top transparent outer sheet. After exposure, the fluid processing composition is distributed between a pair of predetermined adjacent layers within the film unit to initiate a development and diffusion transfer process. The processing fluid includes a light opacification system which prevents light from penetrating the distributed fluid to cause further exposure of the photosensitive elements. This allows the film unit 14 to be ejected from the camera and into the ambient illumination while the development and diffusion transfer process is in progress. Once the positive image is formed it may be viewed by the transparent outer support sheet. For a detailed description of a representative example of such an integral type of self-developing film unit, see U.S. Pat. No. 3,415,644 issued to Edwin H. Land on Dec. 10, 1968.

The spring platen urges the stack of film units 14 upwardly until the forwardmost film unit bears against the interior surface of film container forward wall 70. The forward wall 70 of the film container serves as a reference surface for locating the forwardmost film unit in the stack in position for exposure. Thus, if the film container forward wall 70 is properly located within the camera 10, the forwardmost film unit 14 will be in coincidence with the camera exposure plane.

Subsequent to exposure, the film advance device 24 is adapted to engage the exposed film unit and advance it forwardly through film withdrawal slot 26. To provide access to the trailing end of the forwardmost film unit 14, film container 12 includes an access opening 92 at the trailing end of the film container 12 adjacent to the lateral side wall 78. Access opening 92 is partly defined by a break in the upstanding rib 74 and is located such that it extends rearwardly along forward wall 70 and downwardly through a portion of rear wall 82 to a point slightly below the intersection of rear wall 82 and forward wall 70.

As stated earlier, it is the primary object of the present invention to provide structure within camera 10 which defines a precise operative location for film container 12 such that the forwardmost film unit 14 therein is properly orientated with respect to the camera exposure plane, film advance device 24, and processing rollers 28 and 30.

As best shown in FIG. 4, frame member 46 includes a forward, rear, and a pair of side generally inclined wall sections 96, 98, and 100, respectively, which cooperate to form the hollow cone portion 48.

As best shown in FIG. 5, the hollow cone 48 serves to define the boundaries of the internal camera exposure chamber 20. Extending forwardly from the lower peripheral edge of forward wall section 96 is an integrally molded and generally horizontally extending apron 102 having integrally molded openings 104 and latch tabs 106 therein.

The U-shaped hanger bracket 50 includes a generally planar horizontal member 108 and integrally formed depending side members or legs 110 extending downwardly from the lateral edges of horizontal member 108. Integrally formed with horizontal member 108 are four latching fingers 112 which are adapted to be inserted into the openings 104 in cone apron 102.

As best shown in FIG. 5, fingers 112 cooperate with the openings 104 and latch tabs 106 therein to form snap-together connections for locating the horizontal member 108 of bracket 50 in underlying relation to the horizontal apron 102. Once the hanger bracket 52 is snapped into place on apron 102, the component support member 46 and hanger bracket 50 form the unitized component support frame 52.

Figure 7:
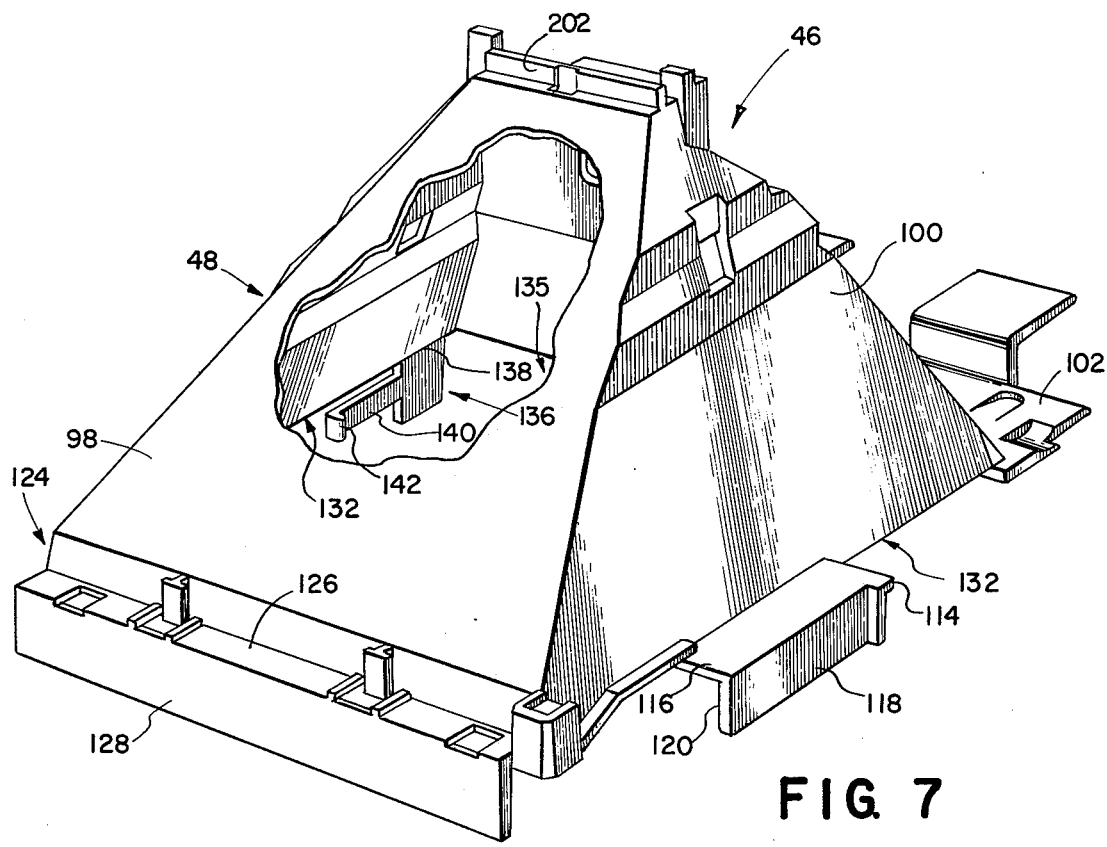
FIG. 7 is a perspective view of a cone-like structure which mounts various components and assemblies.
Figure 8:
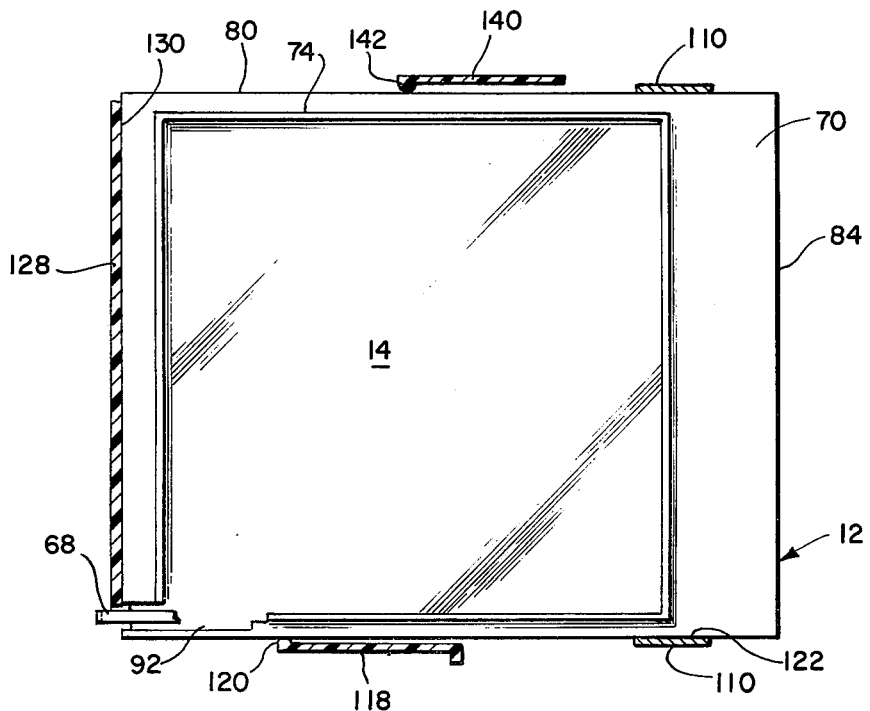
FIG. 8 is a top elevational view of a section of the camera showing the location of a film container within the camera receiving chamber.

Earlier reference was made to key reference bearing surfaces for defining the operative location of film container 12 within the camera 10. As best shown in FIGS. 4 and 7, a lateral film container support member 114 is integrally formed with and extends outwardly from the lower edge of one of the cone side wall sections 100 (closest to the viewer when looking at cone 48 in FIG. 4). Lateral support member 114 includes an outwardly extending horizontal section 116 and a vertically depending section 118 extending downwardly from the outboard end of section 116. Integrally molded on the interior surface of member 118 is a vertical rib 120 which serves as a first key lateral bearing surface. Rib 120 defines the lateral position of film container 12 relative to cone 48 and is adapted to provide a bearing surface against which the lateral side wall 78 of film container 12 bears when a film container 12 is in its operative location. Rib 120 functions as a base line reference surface from which all lateral dimensions of the utilized frame 52 are established. A second key lateral bearing surface for film container sidewall 78 is provided by the interior surface 122 of the depending leg 110 of roller bracket 50. As best shown in FIG. 8, surfaces 122 and rib 120 are in alignment thus providing spaced areas of lateral support for the film container side wall 78. It is important to note that the forward bearing surface 122 derives its lateral orientation from the integrally formed snap connectors on cone apron 102 and bracket 50. The lateral orientation of the snap connectors are, in turn, derived from the lateral bearing surface 120.

The longitudinal orientation of film container 12 is provided by a key bearing surface at the trailing end of cone 48. As best shown in FIGS. 5 and 7, the bottom portion of cone rear wall section 98 includes integrally molded therewith a right angle section 124 comprising a generally horizontal member 126 and a depending vertical member 128 having an interior surface 130 against which the trailing end wall 82 of the film container 12 is adapted to bear. Surface 130 serves as the key longitudinal bearing surface. Its function is to define the longitudinal position of the film container 12 with respect to frame 52. Again, there is a predetermined and fixed orientation between the lateral bearing surface rib 120 and longitudinal bearing surface 130 that is precisely fixed by integrally molding both of these surfaces with the cone 48.

The vertical orientation of film container 12 relative to the reference bearing surfaces 120 and 130 is defined by an integrally molded horizontal surface 132 which extends substantially around three sides of the cone-like member 48 along the bottom edges of side wall sections 100 and rear wall section 98. It is against this surface 132 that a major portion of the film container forward wall 70 is adapted to bear to vertically locate the film container in a fixed and predetermined orientation with respect to the bearing surfaces 120 and 130. The leading end of the film container forward wall 70, intermediate the leading edge of the unstanding rib 74 and the film withdrawal slot 26 is adapted to bear against a second vertical bearing surface 134 defined by the underside of the horizontal member 108 of roller bracket 50. The vertical disposition of bearing surface 134 relative to the primary vertical bearing surface 132 is determined by the integrally molded apron 102 of cone-like member 48.

The vertical bearing surface 132 defines, in part, the boundaries of an opening 135 at the bottom of cone 48 which is at least coextensive with the film container exposure aperture 72. Surface 132 is configured such that the upstanding rib 74 around aperture 72 extends into opening 135 in telescoping fashion. Contact between bearing surface 132 and the forward wall 70 of film container 12 is limited to those portions of forward wall 70 intermediate the lateral sides of rib 74 and the film container side walls 78 and 80 and the portion of forward wall 70 intermediate the trailing end side of rib 74 and film container trailing end wall 82.

Briefly summarizing, the unitized frame 52 includes lateral bearing surfaces 120 and 122, longitudinal bearing surface 130, and vertical bearing surfaces 132 and 134. Bearing surfaces 120, 130, and 132 are integrally molded with cone-like member 48 in predetermined spatial relationship to one another. The bearing surfaces 122 and 134, on roller bracket 50, derive their spatial relationship to bearing surfaces 120, 130, and 134 by the integrally molded snap connectors joining member 46 to bracket 50.

Camera 10 also includes structure for urging the film container 12 into bearing relationship with the key bearing surfaces. The urging means include a spring-like member 136 (see FIG. 7) integrally formed with frame member 46 along and depending from the bottom edge of cone side wall 100 (opposite cone structure 114). The spring-like member 136 is integrally formed with the bottom edge of the cone 48 at 138 and includes a rearwardly extending resilient finger portion 140 which terminates at an integral vertical rib 142 on the interior surface thereof. In the unstressed condition of member 136, the rib 142 extends into the path of travel of film container lateral side wall 80. When the film container 12 is inserted into its operative position, member 136 is stressed outwardly and rib 142 applies a lateral urging force to film container side wall so thereby laterally urging the film container 12 against the lateral bearing surfaces 120 and 122. As will be described hereinafter, camera 10 also includes means providing both longitudinal and vertical urging forces on the film container 12 to maintain it in its operative position against the respective bearing surfaces 130, 132, and 134.

With the previously mentioned key bearing surfaces determining the three-dimensional orientation of the film container 12 relative to the unitized frame 52, the planar position of the forwardmost film unit 14 in the film container 12 is precisely established relative to these key bearing surfaces. Using the key bearing surfaces as a base of reference, the unitized frame 52 includes means for mounting other components of the camera 10 in predetermined spatial relationship to the forwardmost film unit 14.

The cone-like structure 46 includes means for mounting the exposure control module 54 which includes the camera objective lens 18 thereon. The mounting means includes a generally square mounting collar 144 integrally molded with the forward wall section 96. The mounting collar 144 surrounds an opening 146 in the forward wall section 96 through which image bearing light is transmitted by lens 18 into the camera exposure chamber 20. Modular unit 54 includes a complementary collar 147 on the back side of module housing 58 which is adapted to telescope into collar 144 in nesting relationship therewith. Unit 54 is maintained in its operative position by an integrally formed snap fastener (not shown) which is adapted to extend into and latch with an integrally molded complementary snap coupler 148 formed in an interior surface of mounting collar 144.

The reflex mirror 22 is mounted on the interior surface of rear cone wall section 98 and is positioned by wall section 98 in predetermined spatial relationship to the forwardmost film unit 14 in the film container 12. Thus by integrally forming the mirror mounting surface and lens mounting collar 144 with the cone-like structure 48, the optical system (formed by lens 18 and mirror 22) is able to define the cameras exposure plane such that it coincides with the forwardmost film unit and film container 12. Again, all of the appropriate dimensions are taken with respect to the key bearing surfaces 120, 130, and 132 that are integrally molded into the one piece frame member 46.

Modular unit 56 including the film advance device 24 thereon is also precisely located with respect to the forwardmost film unit 14 in film container 12 by structure on the unitized frame 52. As best shown in FIG. 4, the trailing end of the module 56 includes an integrally formed slot 150 which is vertically bounded by upper and lower positioning members 152 and 154, respectively.

Integrally molded with one trailing end corner of frame member 46 is a support and locating block 156 for receiving and accurately positioning the trailing end of modular unit 56. Block 156 includes integrally formed upper and lower keys ways 158 and 160, respectively, for receiving the positioning members 152 and 154 and also includes a transverse horizontal positioning member 162 which extends into slot 150 on the trailing end of the modular unit 56.

The leading end of modular unit 56 includes an integrally formed and generally rectangular slot 164 therein which is adapted to receive an outwardly extending an integrally formed tab 166 on the roller hanger bracket 150 as is best shown in FIGS. 2 and 4 of the drawings. Modular unit 56 also bears up against the side wall portion 100 of cone 48 which provides additional stability and precise location thereto. In a preferred embodiment, modular unit 56 is maintained in its correct position on unitized frame 52 by means of a snap connector arm 167 which is formed with the leading end modular unit 56 and snaps into an opening (not shown) on apron 102.

Again the unitized frame 52 is provided with structure that bears a predetermined spatial relationship to the three key bearing surfaces 120, 130, and 132 for accurately positioning the modular unit 56 (particularly film advance device 24) with respect to the operative location of the forwardmost film unit 14 in film container 12.

As best shown in FIGS. 2 and 4, modular housing unit 44 mounting rollers 28 and 30 is attached to the unitized frame 52. The rollers 28 and 30 are mounted on a roller mounting bracket 168 which includes a pair of laterally spaced mounting arms 170 thereon. Arms 170 have openings 172 therein through which mounting studs 174 on roller assembly mounting bracket 50 are adapted to extend to pivotly mount modular unit 44 on the roller assembly mounting bracket 50. Since the mounting studs 174 bear a predetermined spatial relationship to the film container locating surfaces 122 and 134 on the bracket 50, and bracket 50 is maintained in its predetermined location with respect to the key reference surfaces 120, 130, and 132 on frame member 46, the bite between rollers 28 and 30 may be precisely located with respect to the forwardmost film unit 14 in container 12 and the film withdrawal slot 26.

With the cental core module 38 having all its components mounted thereon, it is adapted to be slidably inserted into camera housing section 40 where cooperating structure in the camera housing 40 and the unitized frame 52 define a receiving chamber 176 (see FIG. 5) in the base of camera 10 for film container 12.

Housing section 40 is of molded plastic construction and includes an open end 180 through which the modular unit 38 is adapted to be slidably inserted to locate it at an operative position within housing section 40 (see FIG. 2).

Housing section 40 includes a bottom wall 182; a pair of said walls 184; a rear wall section defined by a central incline section 186 and a pair of outboards sections 188 joining central section 186 to sidewalls 184; a trailing end wall 185 and a top wall 190. Integrally formed with top wall 190 and portions of one of the side walls 184 and rear wall section 188 is a viewfinder housing 192.

The walls of housing section 40 define an interior chamber that is generally complementary in shape to the modular unit 38.

Housing section 40 and unitized frame 52 include cooperating means for accurately positioning modular unit 38 within housing section 40. As best shown in FIG. 2, the bottom wall 182 of housing section 40 includes a pair of laterally spaced and longitudinally disposed integrally formed channels 194 adjacent housing sidewalls 184 for receiving the bottom edge 196 of the roller bracket legs 110 therein. The top wall 190 of housing section 40 includes a positioning member 198 integrally molded with the interior surface thereof which includes a generally planar and laterally extending bearing surface 200 thereon for supporting a complementary laterally disposed planar surface 202 on an integrally formed upstanding rib 204 located on the top of frame member 46. With the trailing ends of legs 110 abutting against the ends of channels 194, and positioning surface 202 in abutment with locating surface 200, the longitudinal or depth of entry of frame 52 into housing 40 is established. Thus the ends of channels 194 and surface 200 serve as locating stops.

Figure 6:
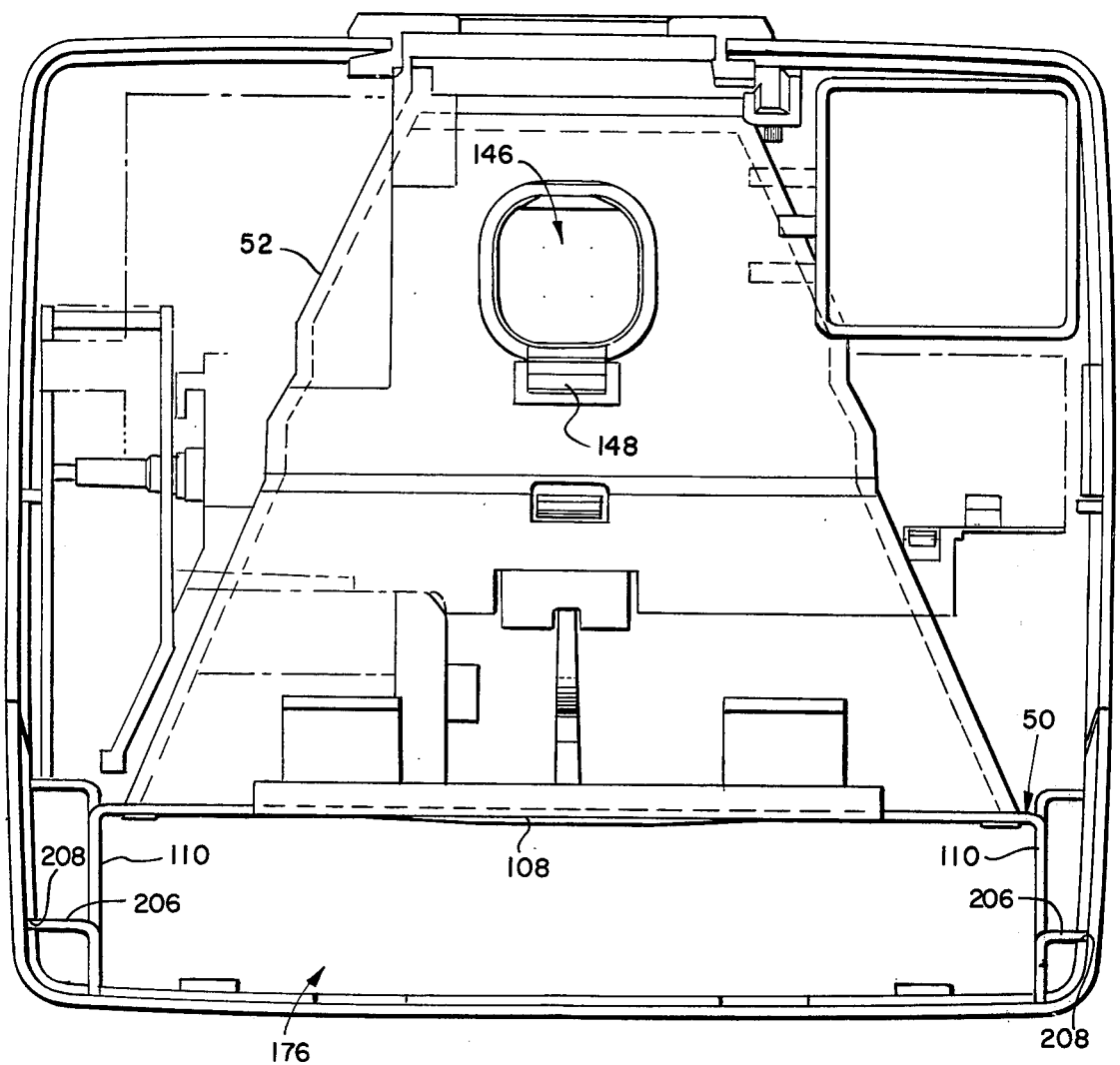
FIG. 6 is a front elevational view of a section of the camera showing the position of the major modular unit within the camera housing.

As best shown in FIGS. 4, and 6, the roller assembly mounting bracket 50 includes a pair of integrally formed and outwardly extending tabs 206 on legs 110. Tabs 206 are adapted to be slidably inserted to a pair of laterally spaced channels 208 which are integrally formed with and are longitudinal disposed on the interior of side walls 184 of housing section 40 adjacent the open end 180 thereof. When located in channels 208, tabs 206 along with the bottom 196 of legs 110 in channels 194 define the vertical orientation of unitized frame 52 within housing section 40.

Once located in position within housing section 40 the modular unit 38 is maintained at its operative position by the rearward thrust exerted thereon by enclosing housing section 42. As best shown in FIG. 2, housing section 40 includes a pair of integrally formed recesses 210 in side walls 184 thereof for receiving integrally molded resilient snap connector 212 on the molded plastic housing section 42.

As mentioned earlier unitized frame 52 and housing section 40 include cooperating structure which defines the film container receiving chamber 176 when modular unit 38 is located at its predetermined position within housing section 40. Receiving chamber 176 is defined by the reference bearing surfaces (120, 122, 130, 132, and 134) the spring-like member 136 and a major portion of the bottom wall 182 of housing section 40. Receiving chamber 176 is open ended at the leading end thereof and modular unit 44 is pivotly mounted on mounting studs 174 for movement between the closed position shown in FIGS. 1 and 5 and an open position (pivoted downwardly) where it is spaced from the open end of chamber 176 thereby allowing a film container 12 to be inserted into or withdraws from receiving chamber 176. Unit 44 is held in its closed position by a latch member 213 which engages a latch projection 215 on roller mounting bracket 168.

As noted earlier, the spring like member 136 applies a lateral urging force to film container 12 to locate the lateral sidewall 78 thereof in bearing relationship with the reference surfaces 120 and 122. As best shown in FIGS. 5, the bottom wall 182 of housing section 40 includes a pair of laterally spaced and integrally molded upstanding projections 214 thereon which engaged the rear wall 76 of film container 12 and urged the film container upwardly to locate the forward wall 70 in bearing relation with the surfaces 132 and 134. Additional upward biasing is provided by a pair of resilient battery contacts 217, supported by wall 182, which engage the terminals of battery 88 through the previously mentioned access openings in rear container wall 76. Although not shown on the drawing, another set of projections may be provided on bottom wall 182 near the trailing end of receiving chamber 176 to provide additional upward biasing for the trailing end of the film container 12 if necessary.

The leading ends of projections 214 include upwardly incline ramp surfaces 216 to facilitate the insertion of the film pack between the upper bearing surfaces 132 and 134 and the top of projections 214. It will be noted that the difference between bearing surface 134 and the top of projections 214 is just slightly smaller than the thickness of the film container 12 to ensure that projections 214 provide a positive urging force on the film container 12. The film container is slightly resilient and a small amount of allowable compression between the forward and rear walls, 70 and 76 respectively, permits the film container 12 to be easily inserted between surface 134 and projections 214.

FIG. 5 shows that the leading edge of the upstanding rib 74 on film container 12 extends vertically higher than the reference surfaces 132 and 134 when a film container is located at its operative position within receiving chamber 176. In order to facilitate the removal of film container 12 from chamber 176, inclined camming surfaces 218 are provided along the leading edge of the cone opening 135 to exposure chamber 20 and serve to facilitate the withdrawal of film container 12.

When film container 12 is fully inserted into chamber 176, rear wall 82 of film container 12 bears against reference surface 130. In order to maintain this bearing relationship, camera 10 includes means for urging the film container rearwardly. The urging means include a pair of inwardly extending and integrally formed tabs 220 on roller mounting bracket arms 170. When the modular unit 44 is located in its closed position, tabs 220 engage the leading end wall 84 of film container 12 (below film withdrawal slot 26) and urge the film container rearwardly to maintain the bearing relationship between trailing end wall 82 and bearing surface 130.

In summary, camera 10 includes two modular units (housing section 40 and modular unit 38) which cooperate to define a receiving chamber 176 when the modular units 40 and 38 are located in predetermined in spatial relationship to one another. It was shown that modular unit 38 includes a unitized frame 52 which is formed by two primary piece parts 46 and 50 each being of single piece construction. By integrally forming a snap connector with each of the two piece parts, they may be connected to form the unitized frame which includes key bearing surfaces against which portions of the film container are adapted to bear to locate a film unit within the container at a predetermined location relative to the unitized frame. The bearing surfaces serve as a base line from which dimensions are established for mounting an optical system, which defines the camera's exposure plan, a film advance device, and a processing station which includes a pair of pressure applying rollers. By use of these techniques and structure, it has been shown that a self-developing camera which is low in cost and easy to manufacture may still be of such precision as to properly locate a self-developing film unit therein for exposure and subsequent processing.

Since certain changes may be made in the above apparatus without departing from the scope of the invention herein involved, it is intended that all matter contained in the above-described description and shown in the accompanying drawings shall be interpreted as illustrative and not in a limiting sense.

We claim:

1. Photographic apparatus for use with a film container holding at least one film unit therein and further including an aperture in the film container through which light is transmitted to expose the film unit, said photographic apparatus comprising:

a housing including an open ended hollow housing section having means therein for defining at least a portion of a receiving chamber for such a film container;

component support means for mounting and supporting components of said apparatus including an optical system which defines an exposure plane at which the film unit in the film container is to be located for exposure, said component support means being dimensioned to be inserted into said hollow housing section, through said open end thereof, and further including means cooperating with said receiving chamber defining means of said housing section for forming a receiving chamber for the film container when said component support means is positioned at a predetermined location in said housing section; and cooperating means in said housing section and on said component support means for supporting and accurately positioning such a film container in said receiving chamber to locate the film unit in the film container at the exposure plane in preparation for exposure through the film container aperture.

2. Photographic apparatus as defined in claim 1 further including cooperating means in said housing section and on said component support means for positioning said component support means at said predetermined location within said housing section.

3. Photographic apparatus as defined in claim 2 wherein said positioning means includes at least one guide channel in said housing section, at least one locating member on said component support means that is slidably insertable into said guide channel for guiding said component support means towards said predetermined location and stop means in said housing section against which said locating member bears to locate said component support means at said predetermined location.

4. Photographic apparatus as defined in claim 2 further including retaining means for retaining said component support means at said predetermined location.

5. Photographic apparatus as defined in claim 4 wherein said retaining means includes a second housing section of said housing that is positioned in closing relation to at least a portion of said open end of said hollow housing section and bears against at least a portion of said component support means.

6. Photographic apparatus as defined in claim 5 further including coupling means of the snap-together type for coupling said second housing section to said hollow housing section such that said second housing section is in said closing relation to said portion of said open end.

7. Photographic apparatus as defined in claim 1 wherein said hollow housing section is of one piece construction and said component support means includes a unitized component support frame for mounting and supporting modular components of said apparatus.

8. Photographic apparatus as defined in claim 7 wherein said unitized frame includes a first support member of one piece construction having integrally formed therewith one part of two part snap-together coupling means and a second support member of one piece construction having the other part of said two-part snap-together coupling means thereon, integrally formed therewith, said first and second support members being connectable by said two-part snap-together coupling means to form said unitized component support frame.

9. Photographic apparatus as defined in claim 7 wherein said unitized component support frame includes locating surfaces thereon against which portions of the film container bear to accurately locate the film container in said receiving chamber so that the film unit in the film container is in position for exposure, and said hollow housing section and said frame further including biasing means for urging such portions of the film container into bearing relationship with said locating surfaces.

10. Photographic apparatus as defined in claim 9 wherein at least a portion of said biasing means is integrally formed with a portion of said unitized component support frame.

11. Photographic apparatus as defined in claim 9 wherein at least a portion of said biasing means is integrally formed with said hollow housing section.

12. Photographic apparatus for use with a film container holding at least one self-developing film and being of the type including a forward wall having an exposure aperture therein through which light is adapted to be transmitted to expose the film unit, a rear wall spaced from the forward wall, a peripheral section intermediate the forward and rear walls and including a pair of opposed lateral side walls and opposed leading and trailing end walls, the leading end wall having a film withdrawal slot therein through which the film unit is advanced subsequent to exposure for the application of pressure thereto by pressure applying means, and further including an access opening adjacent one of the lateral side walls through which film advance means may extend to engage and advance the film unit through the film withdrawal slot towards the pressure applying means, said photographic apparatus comprising:
a housing including a housing section having means for defining a portion of a receiving chamber for such a film container;
a unitized frame being positionable within said housing section and including
 a. means for cooperating with said receiving chamber defining means of said housing section to form a receiving chamber for such a film container;
 b. means for defining an operative location for the film container within said receiving chamber such that the film unit in the film container is in position for exposure;
 c. means for mounting and supporting an optical system for defining an exposure plane which coincides with said exposure position of the film unit as determined by said means defining said operative location for the film container;
 d. means for mounting film advance means in predetermined spatial relation with the access opening of the film container positioned at said operative location; and
 e. means for mounting pressure applying means in predetermined spatial relation to the film withdrawal slot of the film container positioned at said operative location; and
means for maintaining the film container at said operative position within said receiving chamber.

13. Photographic apparatus as defined in claim 12 wherein said unitized frame further includes means for defining an exposure chamber through which light rays are transmitted by the optical system to expose the film unit at said exposure position.

14. Photographic apparatus as defined in claim 12 wherein said means for defining said operative location of the film container includes reference bearing surfaces on said frame against which portions of the film container bear to locate the film container in a predetermined three dimensional orientation with respect to said frame and said exposure plane defined by the optical system mounted on said frame and said means for maintaining the film container at said operative location include means for engaging and urging the film container so that those portions thereof are urged into bearing relationship with said reference bearing surfaces.

15. Photographic apparatus as defined in claim 14 wherein said unitized frame is formed by first and second interlocking frame members being of one piece construction and including one part of two-part snap-together coupling means integrally formed therewith which cooperate to interlock said first and second frame members.

16. Photographic apparatus as defined in claim 15 wherein said first frame member includes an integrally formed first lateral bearing surface against which a portion of the one lateral side wall of the film container having the access opening adjacent thereto bears for laterally locating a lateral edge of the exposure aperture with respect to a lateral edge of the exposure plane and for simultaneously laterally locating the access opening in the film container with respect to film advance means mounted on said unitized frame, an integrally formed longitudinal bearing surface against which a portion of the trailing end wall of the film container bears for longitudinally locating a longitudinal edge of the exposure aperture with respect to a longitudinal edge of the exposure plane, an integrally formed vertical bearing surface against which a portion of the forward wall of the film container bears to vertically locate the film unit in the film container with respect to said exposure plane, said lateral and longitudinal bearing surface being disposed in planes that are substantially normal to said exposure plane and said vertical bearing surface being in a plane that is substantially parallel to said exposure plane, said first frame member further including a portion of said means for maintaining the film container at said operative position in the form of an integrally formed resilient member which is disposed to engage the lateral side wall film container opposite the one lateral side wall having the access opening adjacent thereto for laterally urging the film container within said receiving chamber to bring the one side wall of the film container into bearing relation with said first lateral bearing surface.

17. Photographic apparatus as defined in claim 16 wherein said second frame member includes an integrally formed second lateral bearing surface against which another portion of the one lateral side wall of the film container bears and an integrally formed second vertical bearing surface against which another portion of the forward wall of the film container bears and said means for maintaining the film container at said operative position further includes means in said housing section for engaging a portion of the rear wall of the film container and urging the film container vertically within said receiving chamber to bring the respective portions of the forward wall of the film container into bearing relationship with said first and second vertical bearing surfaces.

18. Photographic apparatus as defined in claim 16 wherein said receiving chamber defining means of said housing and said unitized frame define said receiving chamber such that it has an open end, in the vicinity of said second frame member, through which a film container may be inserted into and withdrawn from said receiving chamber, and said means for maintaining the film container further includes urging means mounted on said second frame member for movement relative thereto between a first position wherein said urging means is out of alignment with said open end to permit film container insertion and withdrawal and a second position where said urging means is aligned with said open end and engages the leading end wall of the film container for longitudinally urging the film container in a direction to bring the trailing end wall of the film container into bearing relationship with said longitudinal bearing surface.

19. Photographic apparatus as defined in claim 18 wherein said movably mounted urging means includes a bracket for supporting a pair of pressure applying rollers thereon.

20. Photographic apparatus as defined in claim 12 wherein said housing section further includes an open end through which said unitized frame is inserted to position said frame within said housing section and a wall section having a portion thereof that serves as said means for defining a portion of said receiving chamber.

21. Photographic apparatus as defined in claim 20 wherein said means on said frame for defining the operative film container location include bearing surfaces against which portions of the film container forward wall are adapted to bear and said means for maintaining the film container at said operative location include a member integrally formed with said portion of said wall section for engaging the rear wall of the film container and urging the film container such that those portions of the forward wall are brought into bearing relation with said bearing surfaces.

22. Photographic apparatus as defined in claim 21 wherein the film container includes a battery therein having battery terminals that are accessible through openings in the rear wall of the film container and said means for maintaining the film container at said operative location further include battery contact means in said housing section for making electrical contact to the battery and also applying an urging force to the film container to urge those portions of the forward wall into bearing relation with said bearing surfaces.

23. Photographic apparatus as defined in claim 12 further including cooperating means in said housing section and on said unitized frame for locating said unitized frame at a predetermined location within said housing section.

24. A photographic camera for use with a film container having an exposure aperture, said camera comprising:
a housing section having a bottom wall;
an exposure chamber cone having an opening therein, said housing section and said cone including complementary means for accurately aligning said cone in operative relationship to said housing section, said housing section being structured to provide an opening through which the film container can be inserted into said camera with the film container's exposure aperture facing said opening of said cone;
a support extending from said cone towards said bottom wall of said housing section to be disposed closely adjacent a side of the film container as the film container is inserted into said camera;
a spring extending from said cone towards said bottom wall of said housing section and structured to engage the side of the film container opposite the first mentioned side of the film container to resiliently seat the film container against said support when the film container is inserted into said camera; and
means for engaging a portion of the film container opposite its exposure aperture and pressing the film container against said cone when the film container is operably disposed within said camera.

25. The photographic camera of claim 24 wherein said cone, said support and said spring are formed of an integrally molded plastic structure.

26. The photographic camera of claim 25 wherein said integrally molded plastic structure additionally includes a second support extending from said cone towards said bottom wall of said housing section and disposed to limit the extent to which the film container can be inserted into said camera through said opening in said housing section thereby tending to align the film container's exposure aperture with said opening of said cone.

27. A photographic camera for use with a film container having a substantially rectangular exposure aperture defined by a rectangular projection extending outwardly from the film container, said camera comprising;
a housing section having a bottom wall;
an exposure chamber cone formed of an integrally molded plastic structure and having portions thereof defining an opening, said portions being structured to receive the projection of the film container in substantially lighttight telescoping fashion to align the film container's exposure aperture with said opening of said cone, said housing section and said cone including complementary means for accurately aligning said cone in operative relationship to said housing section with said opening of said cone facing said bottom wall of said housing section, said housing section being structured to provide an opening through which the film container can be slidably inserted into said camera with the film container's exposure aperture facing said opening of said cone; and
means for pressing the film container against said cone when it is operatively positioned within said camera.

28. The photographic camera of claim 27 wherein said cone additionally includes;
- a first support extending from said cone towards said bottom wall of said housing section to limit the extent to which the film container can be inserted into said camera through said opening in said housing section thereby tending to align the film container's exposure aperture with said opening in said cone;
- a second support extending from said cone towards said bottom wall of said housing section to lie closely adjacent a side of the film container as the film container is slidably inserted into said camera; and
- a spring extending from said cone towards said bottom wall of said housing section and structured to engage the side of the film container opposite the first mentioned side of the film container to resiliently seat the film container against said second support when the film container is inserted into said camera.

* * * * *